United States Patent
Ito

(10) Patent No.: US 7,188,338 B2
(45) Date of Patent: Mar. 6, 2007

(54) APPARATUS AND METHOD FOR DEBUGGING SOFTWARE

(75) Inventor: Masahiro Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 606 days.

(21) Appl. No.: 10/304,948

(22) Filed: Nov. 27, 2002

(65) Prior Publication Data

US 2004/0030960 A1    Feb. 12, 2004

(30) Foreign Application Priority Data

Dec. 6, 2001 (JP) .............................. 2001-372247

(51) Int. Cl.
G06F 9/44 (2006.01)
G06F 11/00 (2006.01)

(52) U.S. Cl. ................... 717/135; 717/130; 714/38

(58) Field of Classification Search ......... 717/124–138
See application file for complete search history.

(56) References Cited

U.S. PATENT DOCUMENTS

| | | | | |
|---|---|---|---|---|
| 5,101,494 A | * | 3/1992 | Bilski et al. | 717/127 |
| 5,603,033 A | * | 2/1997 | Joannin | 717/124 |
| 6,061,283 A | * | 5/2000 | Takahashi et al. | 365/201 |
| 6,785,873 B1 | * | 8/2004 | Tseng | 716/4 |
| 2005/0125754 A1 | * | 6/2005 | Schubert | |

* cited by examiner

*Primary Examiner*—Tuan Dam
*Assistant Examiner*—Chuck Kendall
(74) *Attorney, Agent, or Firm*—Fitzpatrick, Cella, Harper & Scinto

(57) ABSTRACT

In a software debugging apparatus, dump information formed by a hardware simulator is acquired and analyzed. When displaying the result of the analysis, information when software has operated hardware and information when the hardware has changed the value of an I/O register are separately displayed.

8 Claims, 4 Drawing Sheets

| | 31 |
|---|---|
| DISPLAY PANEL | |

| TIME | ACTION | REGISTER A | REGISTER B | REG |
|------|--------|------------|------------|-----|
| 0 | | 00000000 | 00000000 | 000 |
| 100 | HARDWARE | 80000000 | 00000000 | 100 |
| 110 | HARDWARE | 80000000 | 30000008 | 100 |
| 500 | CPU READ | 80000000 | 30000008 | 100 |
| 600 | CPU WRITE | FFFFFFFF | 30000008 | 100 |
| 700 | HARDWARE | FFFFFFFF | 10001000 | 100 |
| 1000 | DMA WRITE | FF00A5A5 | 10001000 | 100 |
| 1010 | DMA WRITE | FF00A5A5 | FF00A5A5 | 100 |
| 1020 | DMA WRITE | FF00A5A5 | FF00A5A5 | FF0 |

FIG.4

APPARATUS AND METHOD FOR DEBUGGING SOFTWARE

BACKGROUND OF THE INVENTION

1. Field of the Invention

The present invention relates to a debugging apparatus and method for debugging software by using a hardware simulator.

2. Description of the Related Art

In recent system LSI (large-scale integrated circuit) development, in order to verify whether or not design is correct before manufacturing hardware, simulation using a simulation model assuming virtual hardware, described with the HDL (Hardware Description Language), the C language or the like. In such simulation, by dumping the waveform of each signal pin, the value of an internal register, and the like in units of a clock signal of hardware, information relating to all signals produced within the hardware can be obtained. The designer of the hardware verifies the designed hardware based on dump information obtained from the hardware simulator.

The dump information is useful for verifying the hardware, and is also very useful for debugging software for controlling the hardware because of the following reason. That is, usually, in debugging of software, there is a limitation in obtained debug information and it is very difficult to obtain detailed information about hardware in units of a clock signal. Furthermore, in debugging of ordinary software, in order to know the state of hardware to be controlled, it is necessary to perform additional processing for debugging, and, as a result, hardware must perform additional operations. When utilizing dump information, such processing is unnecessary.

However, dump information obtained from a hardware simulator is primarily aimed at designing and verifying hardware. Accordingly, although the dump information is effective for verifying the hardware, it contains a considerable amount of information that is unnecessary for debugging software.

Furthermore, since tools for displaying dump information are designed for hardware designers, such as displaying signal waveforms, information necessary for a software designer is not displayed so as to be easily understood by the software designer.

SUMMARY OF THE INVENTION

It is an object of the present invention to provide a software debugging apparatus and method that can extract information necessary for a software designer from dump information obtained from a hardware simulator, and display the extracted information so as to be easily understood by the software designer.

According to one aspect of the present invention, a software debugging apparatus includes acquisition means for acquiring dump information formed by a hardware simulator, discrimination means for discriminating between operation-result information relating to a result of operating hardware by software and change-result information relating to a result of a change by the hardware, and display means for separately displaying the operation-result information and the change-result information.

According to another aspect of the present invention, a software debugging method includes the steps of acquiring dump information formed by a hardware simulator, discriminating between operation-result information relating to a result of operating hardware by software and change-result information relating to a result of a change by the hardware, and separately displaying the operation-result information and the change-result information.

According to still another aspect of the present invention, a computer-readable program for controlling a computer to perform software debugging includes codes for causing the computer to perform the steps of acquiring dump information formed by a hardware simulator, discriminating between operation-result information relating to a result of operating hardware by software and change-result information relating to a result of a change by the hardware, and separately displaying the operation-result information and the change-result information.

Other objectives and advantages besides those discussed above shall be apparent to those skilled in the art from the description of the preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 is a diagram illustrating a case in which debug information is displayed in the form of a list.

DESCRIPTION OF THE PREFERRED EMBODIMENT

A preferred embodiment of the present invention will now be described in detail with reference to the drawings.

Figure 1:
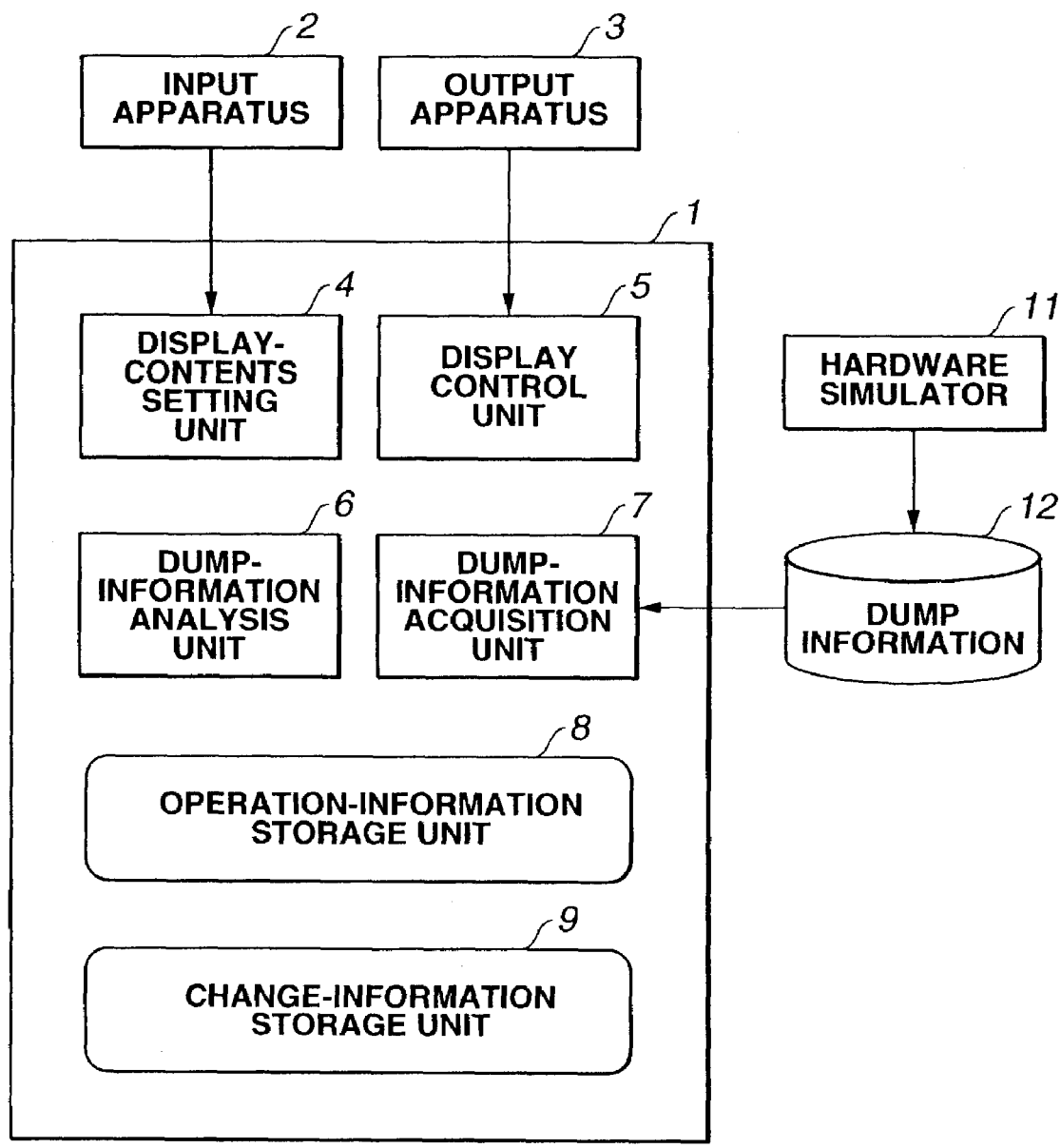
FIG. 1 is a schematic block diagram illustrating the configuration of a software debugging apparatus.

FIG. 1 is a schematic block diagram illustrating the configuration of a software debugging apparatus 1 according to the embodiment.

This software debugging apparatus 1 is configured by storing software in a computer, such as a personal computer, a work station or the like. The software debugging apparatus 1 is connected to an input apparatus 2 including a keyboard, a mouse and the like for inputting necessary information, and an output apparatus 3 configured by a display, such as a CRT (cathode-ray tube) or the like, for displaying information.

A hardware simulator 11 performs simulation using a simulation model assuming virtual hardware, described with the HDL, the C language or the like. In this simulation, information relating to the waveform of each signal pin, the value of each internal register, and the like is formed in units of a clock signal of the hardware as dump information 12. The software debugging apparatus 1 analyzes the dump information 12 obtained from the hardware simulator 11, and executes an application program displayed on the output apparatus 3. This application program and the hardware simulator 11 operate as separate processes in the same computer or separate computers which are in network environment.

This application program executes respective functions of a display-contents setting unit 4, a display control unit 5, a dump-information analysis unit 6 and a dump-information acquisition unit 7. In order to store generated data, the software debugging apparatus 1 forms an operation-information storage unit 8 for storing information when the software operates the hardware, and a change-information storage unit 9 for storing information when the hardware changes the value of an I/O (input/output) register, in a RAM (random access memory) or the like. The dump-information acquisition unit 7 reads the dump information 12 formed by the hardware simulator 11. The dump-information analysis unit 6 analyzes the read dump information, and classifies the read information into information when the software operates the hardware, and information when the hardware changes the value of an I/O register.

The display-contents setting unit 4 sets necessary information including, for example, the form of display assigned by the user, and an object to be displayed. The display control unit 5 performs display on the display apparatus 3 with the contents of display set by the display-contents setting unit 4, based on the operation-information storage unit 8 storing information when the software operates the hardware, and the change-information storage unit 9 storing information when the hardware changes the value of an I/O register.

Figure 2:
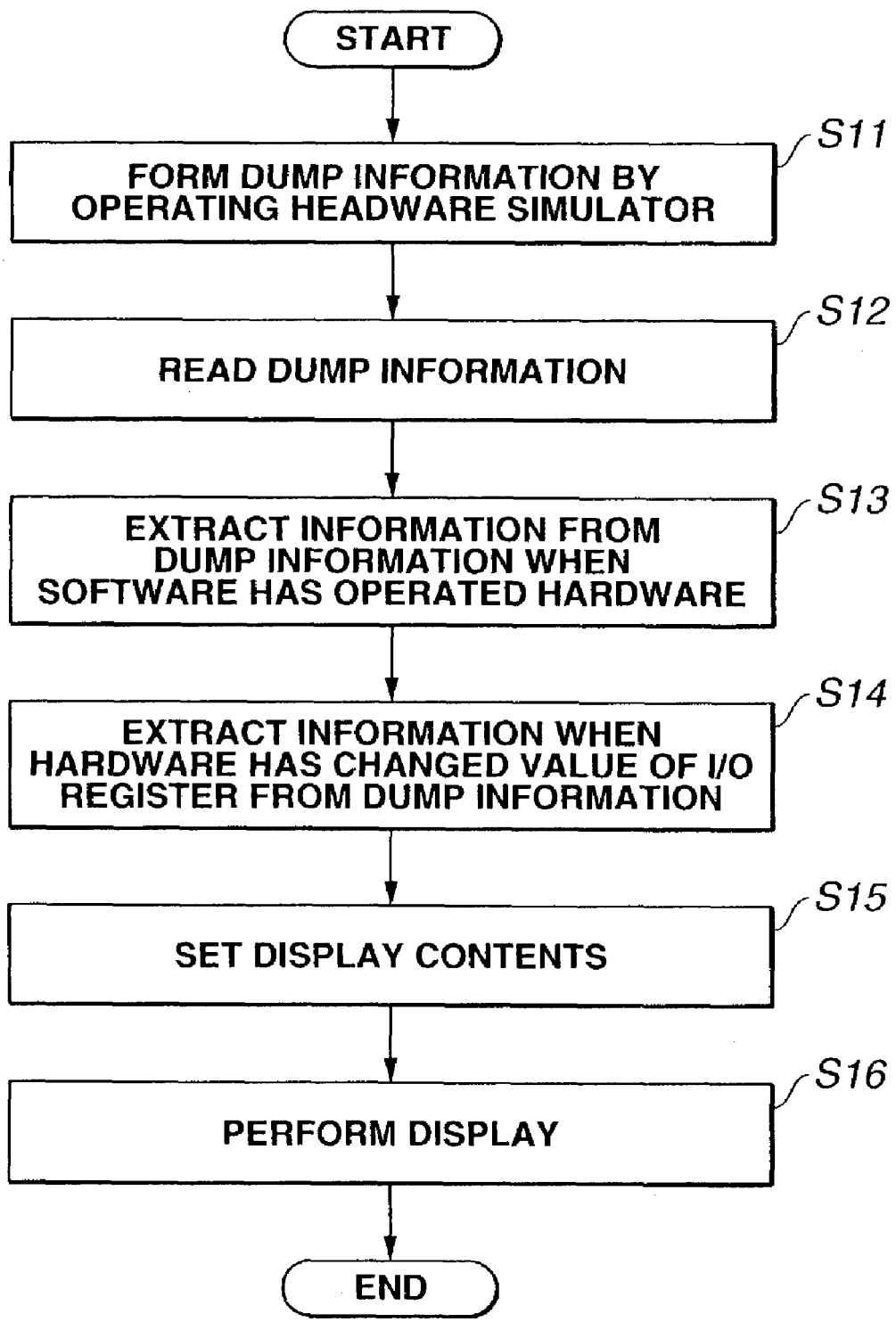
FIG. 2 is a flowchart illustrating the operation of the software debugging apparatus shown in FIG. 1.

Next, the operation of the software debugging apparatus 1 will be described with reference to the flowchart shown in FIG. 2.

First, the dump information 12 is formed by operating the hardware simulator 11 (step S11). The formed dump information 12 is first written in a memory, such as a hard disk, a RAM or the like. At that time, if the dump information 12 has already been formed in the memory, it is unnecessary to operate the hardware simulator 11. If it is intended to use latest information, the hardware simulator 11 must be operated. The dump information 12 is read from the memory by the dump-information acquisition unit 7 (step S12).

When the dump-information acquisition unit 7 can communicate information with the hardware simulator 11, the dump information can be obtained directly from the hardware simulator 11. Accordingly, it is also possible to obtain and display the dump information 12 in cooperation with the hardware simulator 11.

Then, the dump-information analysis unit 6 extracts information when the software has operated the hardware, from the read dump information (step S13). The software's operations with respect to the hardware are, for example, READ/WRITE by a CPU (central processing unit), and READ/WRITE by a DMA (direct memory access) controller. Each of these operations can be identified from information including the waveform of a signal, and the like included in the dump information 12. Thus, the dump information 12 is analyzed in units of a clock signal of the hardware, information relating to the value of an I/O register when each of the above-described operations has been performed is extracted, and the extracted information is stored in the operation-information storage unit 8.

The dump-information analysis unit 6 also extracts information when the hardware changes the value of an I/O register (step S14). A change of the value of the I/O register can be identified by comparing the current value with the value at the immediately preceding clock signal. This operation is not performed when the software is operating the hardware and the extracted information overlaps with the information extracted in step S13. Thus, the dump information 12 is analyzed in units of a clock signal of the hardware, information relating to the value of an I/O register when the hardware has changed the value of the I/O register, and the like is extracted, and the extracted information is stored in the change-information storage unit 9.

Next, setting of the contents of display when displaying information on the output apparatus 3 is performed (step S15). The processing of this step is performed when the user intends to uniquely assign the contents of display. If a display form at initial setting is used, there is no particular processing to do.

Figure 3:
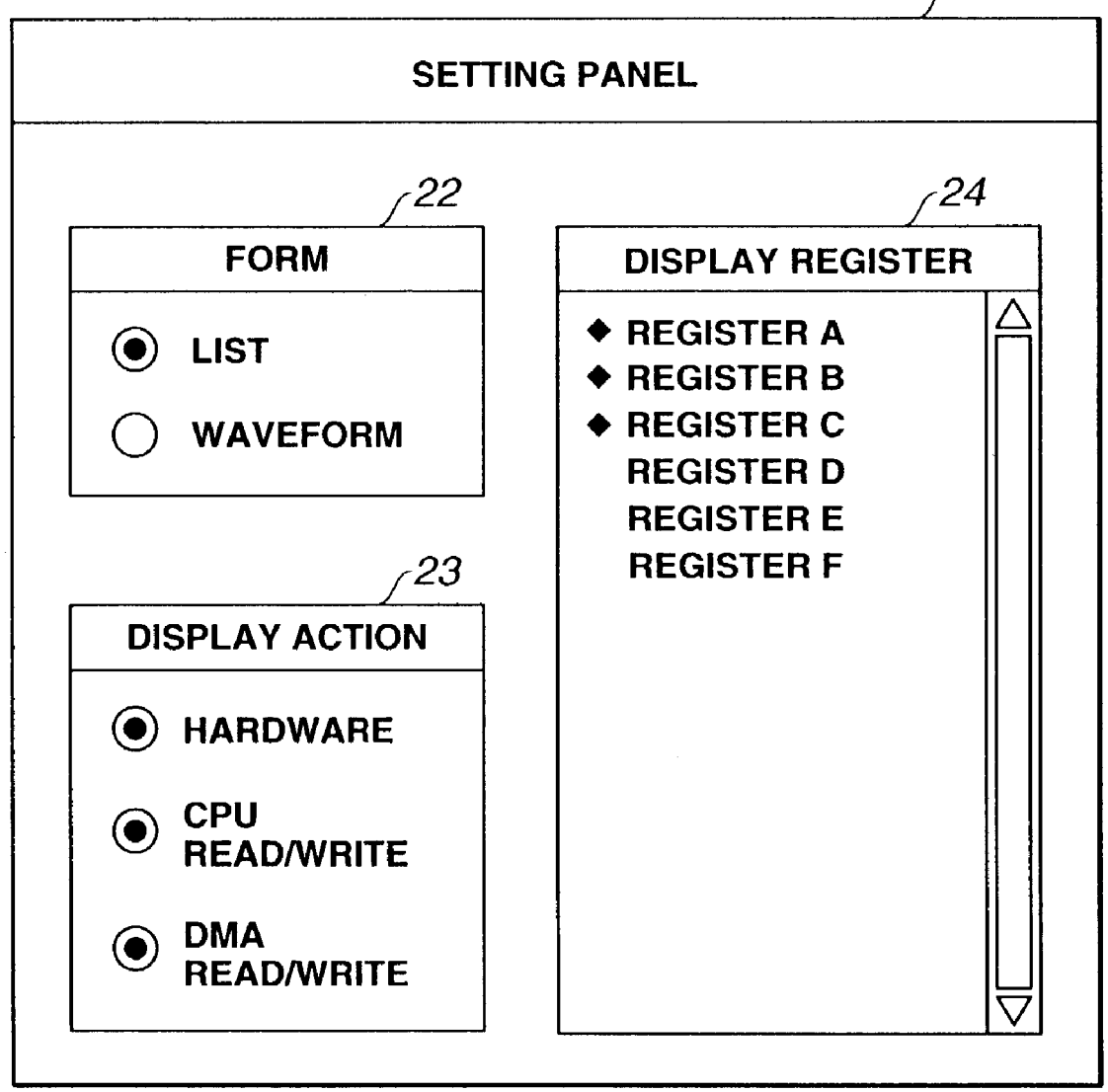
FIG. 3 is a diagram illustrating a setting panel for setting a display method.

FIG. 3 illustrates a setting panel 21 displayed on the output apparatus 3 when the user intends to change the contents of display. The user inputs setting information using the input apparatus 2. On the setting panel 21, in form 22, a display form, i.e., for example, whether display is to be performed in the form of a list or in the form of a waveform, is set. In display action 23, whether or not information when the hardware has changed the value of the I/O register is to be displayed, and whether or not information when the software has operated the hardware (READ/WRITE by the CPU, and READ/WRITE by the DMA controller) is to be displayed, as information to be displayed, are set. In display register 24, each I/O register whose value is to be displayed is set.

In the state shown in FIG. 3, setting is performed so that information relating to each of three registers (registers A, B and C) is displayed in the form of a list, in a case in which the hardware has changed the value of each I/O register, and in a case in which the software has operated the hardware.

Finally, information is displayed on the output apparatus 3 (step S16). The display control unit 5 displays information when the software has operated the hardware and information when the hardware has changed the value of each I/O register, that are stored in the operation-information storage unit 8 and the change-information storage unit 9, respectively.

FIG. 4 is a diagram illustrating an example of display on the output apparatus 3, when the contents of display are set in the state shown in FIG. 3.

In FIG. 4, on a display panel 31, a column of time 32 indicates when displayed information has been obtained in simulation time. A column of action 33 indicates whether displayed information is obtained when the hardware has changed the value of each I/O register, or when the software has operated the hardware (READ/WRITE by the CPU, or READ/WRITE by the DMA controller). Each of a column 34 of a register A, a column 35 of a register B, and a column 36 of a register C indicates the value of the corresponding register. Each of a row is added if the status is changed in a column of action 33 of any of registers.

For example, on the row of time 100, the hardware has changed the value of the register A from 00000000 to 80000000. From time 0 to time 99, the value of the register A remains 00000000. On the row of time 600, the software has performed WRITE in the CPU, and the value of the register A has changed from 80000000 to FFFFFFFF. Thus, the WRITE operation of the CPU can be confirmed. Similarly, it is also possible to confirm an operation by the DMA controller, and the like.

According to the above-described embodiment, when the software debugging apparatus analyzes dump information formed by the hardware simulator and displays the result of the analysis, information when the software has operated the hardware and information when the hardware has changed the value of an I/O register are separately displayed. Hence, it is possible to extract information necessary for a software designer from dump information obtained from the hardware simulator, and display the extracted information so as to be easily understood by the software designer.

The present invention may also be applied to a case in which, in order to operate various devices so as to realize the functions of the above-described embodiment, a computer within an apparatus or a system connected the various devices is supplied with program codes of software for realizing the functions of the above-described embodiment, and the various devices are operated by the computer (or a CPU or an MPU (microprocessor unit)) of the system or the apparatus in accordance with the supplied program. In such a case, the program codes themselves read from a storage medium realize the functions of the above-described embodiment, so that the program codes themselves, or means for supplying the computer with the program codes, such as a storage medium storing the program codes constitute the present invention.

For example, a floppy disk, a hard disk, an optical disk, a magnetooptical disk, a CD (compact disc)-ROM (read-only memory), a CD-R (recordable), a magnetic tape, a nonvolatile memory card, a ROM or the like may be used as the storage medium for supplying the program codes.

Such program codes are, of course, included within the scope of the present invention not only in a case in which the functions of the above-described embodiment are realized by executing the program codes read by a computer, but also to a case in which the functions of the above-described embodiment are realized in cooperation with an OS (operating system) operating in a computer, another application software or the like based on instructions of the program codes.

The present invention may, of course, also be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiment are realized by the processing.

When applying the present invention to the above-described storage medium, program codes corresponding to the above-described flowchart may be stored in the storage medium.

The individual components designated by blocks in the drawings are all well known in the software debugging apparatus and method arts and their specific construction and operation are not critical to the operation or the best mode for carrying out the invention.

Although the present invention has been described in its preferred form with a certain degree of particularity, many apparently widely different embodiments of the invention can be made without departing from the spirit and scope thereof. It is to be understood that the invention is not limited to the specific embodiments thereof except as defined in the appended claims.

What is claimed is:

1. A software debugging apparatus comprising:
    acquisition means for acquiring dump information formed by a hardware simulator;
    discrimination means for discriminating between operation-result information relating to a result of operating hardware by software and change-result information relating to a result of a change by the hardware; and
    display means for displaying the operation-result information and the change-result information, such that the displayed operation-result information is distinguishable from the displayed change-result information.

2. A software debugging apparatus according to claim 1, wherein said acquisition means can communicate information with the hardware simulator, and directly acquires the dump information in cooperation with the hardware simulator.

3. A software debugging apparatus according to claim 1, further comprising setting means for setting contents of display by said display means.

4. A software debugging apparatus according to claim 3, wherein said setting means sets a display form.

5. A software debugging apparatus according to claim 3, wherein said setting means sets action items as the contents of display.

6. A software debugging apparatus according to claim 3, wherein said setting means sets each register whose data is to be displayed.

7. A software debugging method comprising the steps of:
    acquiring dump information formed by a hardware simulator;
    discriminating between operation-result information relating to a result of operating hardware by software and change-result information relating to a result of a change by the hardware; and
    displaying the operation-result information and the change-result information, such that the displayed operation-result information is distinguishable from the displayed change-result information.

8. A computer-readable storage medium containing a program for controlling a computer to perform software debugging, said program comprising codes for causing the computer to perform the steps of:
    acquiring dump information formed by a hardware simulator;
    discriminating between operation-result information relating to a result of operating hardware by software and change-result information relating to a result of a change by the hardware; and
    displaying the operation-result information and the change-result information, such that the displayed operation-result information is distinguishable from the displayed change-result information.

* * * * *